(12) United States Patent
Coin

(10) Patent No.: US 8,398,452 B2
(45) Date of Patent: Mar. 19, 2013

(54) SINGLE REED TURKEY GOBBLE CALL

(75) Inventor: Mark Coin, Greenville, KY (US)

(73) Assignee: Down-N-Dirty Outdoors, Inc., Lewisburg, KY (US)

(*) Notice: Subject to any disclaimer, the term of this patent is extended or adjusted under 35 U.S.C. 154(b) by 0 days.

(21) Appl. No.: 13/430,069

(22) Filed: Mar. 26, 2012

(65) Prior Publication Data

US 2012/0295511 A1 Nov. 22, 2012

Related U.S. Application Data

(63) Continuation-in-part of application No. 13/347,681, filed on Jan. 10, 2012, and a continuation-in-part of application No. 13/109,803, filed on May 17, 2011.

(51) Int. Cl.
*A63H 5/00* (2006.01)

(52) U.S. Cl. .......... 446/207; 446/397

(58) Field of Classification Search .......... 446/202, 446/207, 213, 397
See application file for complete search history.

(56) References Cited

U.S. PATENT DOCUMENTS

| | | | |
|---|---|---|---|
| 2,396,359 A | 3/1946 | Yager | |
| 2,488,838 A | 11/1949 | Tierce | |
| 2,544,370 A | 3/1951 | Walther | |
| 2,556,388 A | 6/1951 | Bicocchi | |
| 2,651,141 A | 9/1953 | Bicocchi | |
| 2,711,614 A | 6/1955 | Halsten | |
| 2,835,077 A | 5/1958 | Mittelsteadt | |
| 4,048,750 A | 9/1977 | Wolfe | |
| 4,138,800 A | 2/1979 | Lege | |
| 4,343,108 A | 8/1982 | Lee | |
| 4,737,130 A | 4/1988 | Mann | |
| 4,888,903 A * | 12/1989 | Knight et al. | 43/1 |
| 4,950,198 A | 8/1990 | Repko, Jr. | |
| 4,950,201 A * | 8/1990 | Sceery | 446/207 |
| 5,234,368 A | 8/1993 | Carraway | |
| 5,549,498 A | 8/1996 | Kirby | |
| 5,910,039 A * | 6/1999 | Primos et al. | 446/207 |
| 6,234,860 B1 | 5/2001 | Cook | |
| 6,527,614 B1 * | 3/2003 | Primos | 446/207 |
| 7,918,709 B1 | 4/2011 | Primos et al. | |
| 2003/0082988 A1 * | 5/2003 | Gendron et al. | 446/207 |
| 2005/0076768 A1 | 4/2005 | Pfortmiller et al. | |
| 2010/0233933 A2 | 9/2010 | Drury | |

OTHER PUBLICATIONS

Midwest Turkey Call Supply—online catalog "TF-07 Turkey Flute".

* cited by examiner

*Primary Examiner* — Gene Kim
*Assistant Examiner* — Alyssa Hylinski
(74) *Attorney, Agent, or Firm* — Waddey & Patterson, P.C.; Matthew C. Cox

(57) ABSTRACT

A single reed turkey gobble call includes a barrel through which a user blows air. A reed assembly is positioned in the barrel. The reed assembly includes a tone board and a reed positioned against the tone board. A wedge engages the reed, and the reed is partially clamped between the wedge and the tone board such that a distal end of the reed is free to vibrate against the tone board. A vertex is defined on the tone board at the location where the reed separates from the tone board. The wedge is axially offset from the vertex in the axial direction away from the distal reed end by a wedge offset distance to produce a gobble sound.

30 Claims, 9 Drawing Sheets

SINGLE REED TURKEY GOBBLE CALL

CROSS-REFERENCES TO RELATED APPLICATIONS

This nonprovisional utility patent application claims domestic priority under 35 U.S.C. §120 to U.S. patent application Ser. No. 13/347,681 entitled Single Reed Turkey Gobble Call filed Jan. 10, 2012 and also to U.S. patent application Ser. No. 13/109,803 entitled Single Reed Turkey Gobble Call filed May 17, 2011.

BACKGROUND

1. Technical Field

The present invention relates generally to game calls and more particularly to single reed calls for imitating the gobble of a male turkey.

2. Background Art

Game calls are devices that are used to imitate or mimic the sound of a wild animal such as a game bird. Game calls are typically used by hunters to draw game animals closer to the hunter's location and within range of a firearm.

Turkey hunting is a popular type of hunting that focuses on harvesting male wild turkeys. An important aspect of turkey hunting is the thrill and excitement associated with observing or hearing a male wild turkey gobble. Male wild turkeys make a gobble sound to attract female turkeys or to assert dominance over other male turkeys, especially during spring mating season which generally coincides with turkey hunting season in most jurisdictions. The male turkey gobble sound is very distinct from any other wild game sound. For example, the gobble sound of a male wild turkey is not similar to any sound made by a duck or a goose. Additionally, the gobble sound made by male turkeys is much different than any sound made by a female turkey, or hen. Hens typically create sounds known as yelps, clucks and purrs. These are repetitive single-note sounds, while in contrast the gobble is a complex and violent sound. The gobble sound can be used by a male wild turkey either to attract a hen for mating or to warn other male turkeys in the area to leave.

When two mature male wild turkeys are in the same vicinity, it is possible that each male turkey will hear the other making the gobble sound. This type of vocal challenge among male turkeys is known to cause aggressive behavior and can result in physical confrontations. In many instances, especially during mating season, a male turkey that hears a gobble call of another male turkey will become excited and seek out the other male turkey to initiate a confrontation. Thus, it is advantageous for hunters to be able to accurately imitate the gobble sound of a male turkey to attract male turkeys to the hunter's location.

Generally, one way a turkey hunter may draw a wild male turkey close is by imitating the sounds other turkeys make. This is traditionally done using a game call. Several types of turkey game calls exist. Mouth calls typically include a plastic frame having a flexible diaphragm positioned on the frame. A hunter or caller can place the mouth call in his or her mouth and then blow air across the diaphragm to imitate the sound of a turkey. However, conventional mouth calls are often limited to reproducing the sounds made by female turkeys and do not produce a gobble sound. Some diaphragm-type mouth calls may be used to produce a gobble sound, but are difficult to use by most users for such purposes.

Other types of turkey calls are also known in the art. Box calls typically use a wooden box frame having a sliding cover that scrapes the upper edges of the box walls. As the cover is slid over the walls, a sound is created. However, conventional box calls make the sound of a hen, but are generally not operable to make a gobble sound. Slate calls are another type of turkey call that generally include a stick, or hammer, that can be manually rubbed against a slate or glass disk. Slate calls, however, are also only operable to produce hen sounds and cannot be used to reproduce the distinctive gobble sound.

Others have attempted to satisfy the need for a turkey game call that can reproduce the sound of a male turkey gobble. Some conventional game calls for imitating a male turkey gobble sound include shaker calls having a tube with a moveable piston positioned in the tube and an opening on one end. When a user shakes the tube, the member can reciprocate back and forth and air can be ejected from the tube to create a sound. In various configurations, the structures of shaker calls can be configured so that the emitted sound simulates a gobble. However, the range of such shaker gobble calls is very limited because the air pressure and velocity generated by shaking the tube is insufficient to create a loud sound that carries a great distance through dense woods. In many hunting situations, male turkeys may be located several thousand yards away, so it is critical that a gobble call be able to create a gobble sound that is capable of carrying a significant distance through wooded terrain. Conventional duck and goose calls that utilize a tube, or barrel, through which a user blows air, are capable of generating loud sounds that can travel long distances. However, such conventional duck and goose calls are not operable to produce the unique gobble sound.

Another problem associated with conventional game calls is alignment of the reed with the tone board and wedge. Precise positioning between the reed, wedge and tone board must be achieved to provide a desired sound. Such precise positioning may require manual assembly of game calls, which is inefficient. Even when manual assembly is performed, it is still possible for the call elements to become misaligned prior to or during shipment or use. For example, when a properly tuned call is dropped or impacted against a surface, the reed may become misaligned relative to the wedge and tone board, resulting in an undesirable sound. Others have attempted to solve this problem by providing guides on the wedge or tone board for the reed. However, such guides allow slippage following impact and generally do not locate the reed at a specific desired position when the call is assembled.

What is needed then is a male turkey gobble call that allows a user to blow air through a tube, like in a conventional duck or goose call, but that also reproduces a male turkey gobble sound. Also needed are improvements in devices and methods of manufacturing game calls to allow repeatable positioning of the reed relative to the wedge and tone board and to prevent inadvertent misalignment of the reed.

BRIEF SUMMARY

The present invention generally provides a turkey call, and specifically a male turkey gobble call, having a barrel through which a user blows air and a reed assembly across which the blown air travels, thereby vibrating a reed. The reed assembly and/or barrel are configured such that the sound emitted by the vibrating reed simulates the sound of a male turkey gobble.

In some embodiments, the present invention provides a turkey gobble call including a tone board defining a U-shaped channel extending partially along an axial length of the tone board, the channel terminating at a channel end wall. A reed positioned is against the tone board over the channel, and a wedge is positioned against the reed so that the reed is partially clamped between the tone board and the wedge. The reed includes a distal reed end extending from the wedge toward the channel end wall. The tone board includes a first board region engaging the reed and a second board region separated from the reed by a reed gap. The tone board includes a vertex located where the first board region meets the second board region. The reed includes a free reed section length defined as the distance between the vertex and the distal reed end. The wedge is axially offset from the vertex in the direction away from the distal reed end by a wedge offset distance. In some embodiments, a ratio of the free reed section length to the wedge offset distance is between about 2.0 and about 5.0.

A further embodiment of the present invention provides a turkey gobble call including a barrel defining an axial bore and a reed assembly disposed in the axial bore. The reed assembly includes a tone board and a reed positioned adjacent the tone board. The reed includes a first reed hole defined in the reed. A wedge is positioned against the reed, and a first pilot post extends through the first reed hole between the wedge and the tone board.

Yet another embodiment of the present invention provides a turkey gobble call apparatus including a barrel defining an axial bore, a tone board including a first tone board pilot post extending from the tone board, and a wedge including a first wedge pilot hole defined in the wedge. A reed is disposed between the tone board and the wedge. The reed includes a first reed hole defined in the reed. The first tone board pilot post extends through the first reed hole into the first wedge pilot hole. The tone board, the wedge and the reed are disposed in the axial bore.

Yet another embodiment of the present invention provides a reed apparatus for installation between a wedge and a tone board in a turkey gobble call. The reed apparatus includes a reed including a first curved reed end and a longitudinally opposite second curved reed end. A center reed section forming a substantially rectangular profile is disposed between the first and second curved reed ends. A reed hole is defined through the reed for positioning the reed at a desired location relative to the wedge and the tone board.

A further embodiment of the present invention provides a method of manufacturing a game call. The method includes the steps of: (a) providing a tone board having a tone board channel and a tone board mounting surface; (b) positioning a reed against the tone board mounting surface, the reed including at least one reed hole extending through the reed; (c) positioning a wedge against the reed; and (d) positioning a pilot post through the reed hole in the reed between the tone board and the wedge such that the reed is positioned at a desired location relative to the wedge and tone board.

Numerous other objects, features and advantages of the present invention will be readily apparent to those skilled in the art upon a reading of the following description when taken in conjunction with the accompanying drawings.

DETAILED DESCRIPTION

Figure 1:
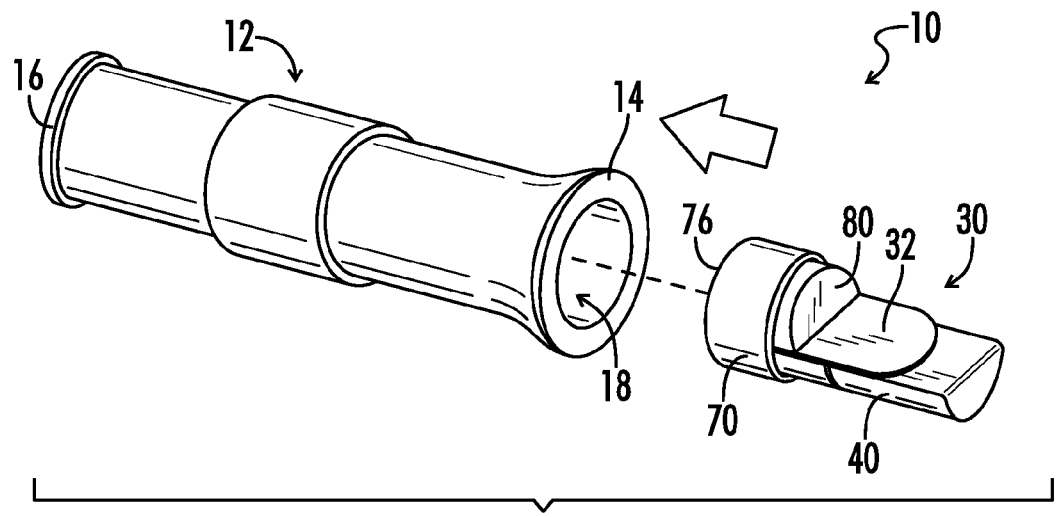
FIG. 1 illustrates a partially exploded perspective view of an embodiment of a gobble call in accordance with the present invention.

Referring now to the drawings, FIG. 1 illustrates a partially exploded perspective view of an embodiment of a single reed turkey gobble call 10 in accordance with the present invention. Turkey gobble call 10 includes a barrel 12 and a reed assembly 30. Barrel 12 includes an axial bore 18. Axial bore 18 generally forms a clearance passage through the entire length of barrel 12 such that air can be blown from a user's mouth into a first barrel end 14, through axial bore 18 of barrel 12, and out a second barrel end 16. Barrel 12 includes an axisymmetric tube in some embodiments. Barrel 12 can be constructed of, or can include, a variety of materials, including wood, acrylic, metal, polycarbonate, polymers, high strength styrene or polystyrene or any other suitable material for a game call. In some embodiments, barrel 12 includes a one-piece barrel of unitary construction, as opposed to many conventional game calls which include a two-piece barrel construction. In further embodiments, barrel 12 includes a two-piece barrel.

A reed assembly 30, or guts, can be inserted into axial bore 18. Reed assembly 30 can be pre-assembled and subsequently inserted into axial bore 18, as illustrated in FIG. 1. Reed assembly 30 includes a tone board 40, a wedge 80 and a reed 32. When reed assembly 30 is assembled as seen in FIG. 1, reed 32 is positioned adjacent tone board 40, and wedge 80 is positioned against reed 32 such that reed 32 is partially clamped between tone board 40 and wedge 80. In some embodiments, when reed assembly 30 is disposed in barrel 12, reed assembly 30 is completely housed in barrel 12 such that no portion of reed assembly 30 extends from the barrel 12.

In some embodiments, an annular sleeve 70 can be positioned around the reed assembly 30, including around a portion of tone board 40, wedge 80 and reed 32, for securing wedge 80 against reed 32 and tone board 40. Annular sleeve 70 can include a plastic or acrylic hoop-shaped material in some embodiments. In other embodiments, annular sleeve 70 can include a fibrous material such as wood or other suitable materials such as but not limited to metal or other plastics. Sleeve 70 includes a proximal sleeve end 76 which is the first portion of sleeve 70 inserted into barrel 12. Wedge, tone board and sleeve can be constructed of or include a variety of materials, including wood, acrylic, metal, polycarbonate, polymers, high strength styrene or polystyrene or any other suitable material for a game call.

Figure 2:
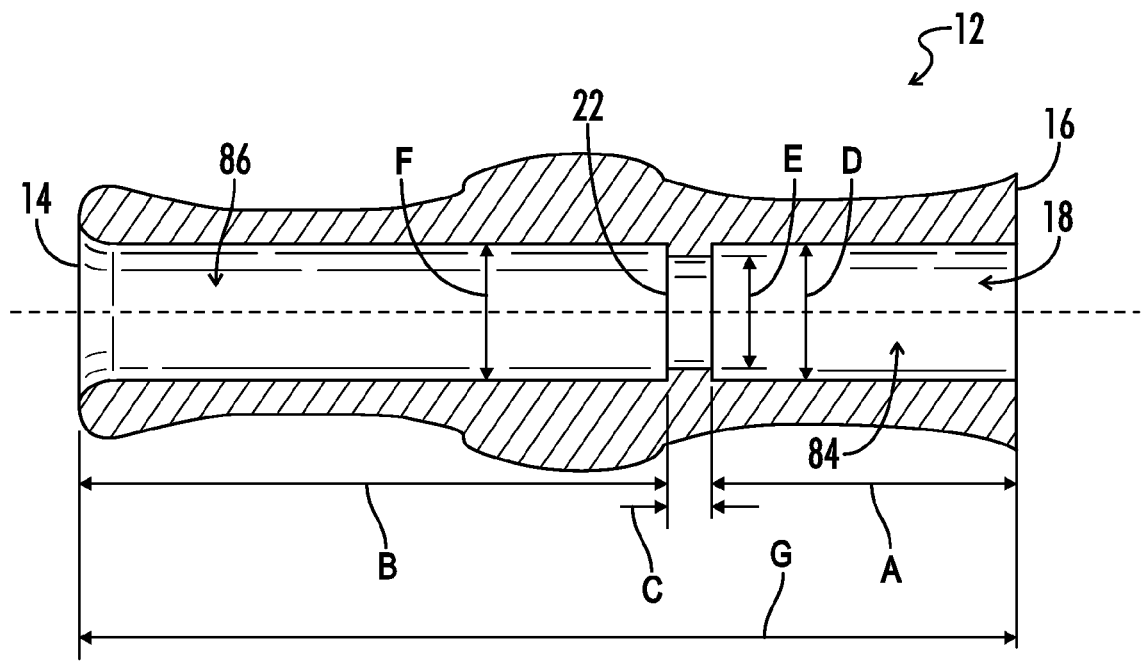
FIG. 2 illustrates a cross-sectional view of an embodiment of a barrel in accordance with the present invention.

In some applications it may be desirable to provide a structure in axial bore 18 to provide a stop for reed assembly 30. As seen in the cross-sectional view in FIG. 2, in some embodiments, an inner flange 22 projects radially inward from the inner surface of the barrel 12 facing the axial bore 18. Inner flange 22 divides barrel 12 into two regions—a receiving chamber 86 and an exit chamber 84. Air is generally blown into receiving chamber 86 from first barrel end 14 and exits through exit chamber 84 toward second barrel end 16. Inner flange 22 generally projects radially inwardly a distance to provide a structure for stopping reed assembly 30 from advancing too far into axial bore 18 when inserted. In some embodiments, the turkey gobble call 10, or gobble call 10, is operable to emit a turkey gobble sound when the reed assembly 30 is located within a predetermined range of positions relative to axial bore 18. In some embodiments, as seen in FIG. 1 and FIG. 2, reed assembly 30 is inserted into axial bore 18 such that proximal sleeve end 76 rests against inner flange 22. In other embodiments, reed assembly 30 is inserted into axial bore 18 such that wedge 80 or tone board 40 rests against inner flange 22. When reed assembly 30 is positioned in axial bore 18 such that proximal sleeve end 76, wedge 80 or tone board 40 engages inner flange 22, reed assembly 30 may be said to be in a fully seated position in barrel 12. In a fully seated position, reed assembly 30 is fixed in place in an optimal position to produce a turkey gobble sound. Reed assembly 30 may be fixed in the fully seated position by a friction fit between the interior of barrel 12 and the outer dimension of reed assembly 30, i.e. of sleeve 70. In some embodiments, sleeve 70 includes an outer diameter substantially equal to or slightly larger than the inner diameter of barrel 12 near inner flange 22 such that reed assembly 30 stays in a fully seated position when inserted into barrel 12. In other embodiments, it may be desirable to produce a turkey gobble call 10 wherein reed assembly is more permanently fixed in place in barrel 12. The precise positioning of various features of the gobble call 10 contributes to the ability of the device to reproduce a gobble sound. Commonly, users of game calls seek to disassemble calls to "tune" the guts or to see how the call works. In some embodiments of the present invention, a glue or adhesive is disposed between reed assembly 30 and barrel 12 to prevent a user from removing reed assembly 30 from barrel 12. A method of producing a turkey gobble call, in some embodiments, includes applying a layer of adhesive to either the barrel or the reed assembly, or both, and then inserting the reed assembly into the barrel. Such permanent attachment of reed assembly 30 to barrel 12 using an adhesive can prevent a user from accidentally changing the configuration of reed assembly 30 and inadvertently detuning the call.

The fully seated reed assembly position is determined by the axial location of inner flange 22. The relative dimensions of barrel 12 and inner flange 22 can also influence various aspects of the quality of the gobble sound produced. In some embodiments, as seen in FIG. 2, barrel 12 includes an axial length G. The total axial length G represents the distance from first barrel end 14 to second barrel end 16. Total axial length G in some embodiments is between about one-hundred to about one-hundred-fifty millimeters, and in a more preferred embodiment between about one-hundred-twenty millimeters and about one-hundred-thirty-five millimeters. In an additional embodiment, G is about 127 millimeters. In other embodiments, total axial length G can be greater than or less than this amount.

Barrel 12 also includes an axial flange length C measured as the axial length of the inner flange 22. Axial flange length C in some embodiments can range between about two and about ten millimeters, and more preferably between about six and about seven millimeters. In other embodiments, axial flange length C can be greater than or less than this amount. Axial flange 22 is generally positioned a distance from first barrel end 14 equal to the receiving chamber length B. The receiving chamber length B in some embodiments is between about sixty millimeters and about ninety millimeters. In a more preferred embodiment, receiving chamber length B is between about seventy millimeters and about eighty millimeters. In another embodiment, receiving chamber length B is about seventy-five millimeters.

On the side of inner flange 22 opposite receiving chamber 86 is exit chamber 84. Exit chamber 84 includes an axial exit chamber length A. In some embodiments, axial exit chamber length A is greater than receiving chamber length B and is between about thirty-five and about fifty-five millimeters. In a more preferred embodiment, exit chamber length A is between about forty and about fifty millimeters. In another embodiment, exit chamber length A is about forty-five millimeters.

In some embodiments, a feature of the present invention that contributes to the production of a desired gobble sound is the ratio of receiving chamber length B to the exit chamber length A. In some embodiments, the ratio of B divided by A is greater than one. In further embodiments, the ratio of B divided by A is between about one and about 2.5. Additionally, in a more preferred embodiment, a ratio of B divided by A between about 1.5 and about 1.9 produces a gobble sound with desired characteristics. In some embodiments, a ratio of B divided by A of about 1.7 produces a desired gobble sound.

Referring further to FIG. 2, in some embodiments, receiving chamber 86 includes a receiving chamber diameter F.

Receiving chamber diameter F in some embodiments is between about fifteen and about twenty-five millimeters. In other embodiments, receiving chamber diameter F is between about eighteen and about twenty millimeters. Exit chamber 84 includes an exit chamber diameter D that is in some embodiments substantially equal to receiving chamber diameter F. In some embodiments, exit chamber diameter D is between about fifteen and about twenty-five millimeters. In other embodiments, exit chamber diameter D is between about eighteen and about twenty millimeters.

Inner flange 22 includes an inner flange diameter E less than receiving chamber diameter F such that inner flange 22 provides an axial stop for reed assembly 30. In other embodiments, not shown, exit chamber diameter D may be less than receiving chamber diameter F, and inner flange 22 is integrally formed as a shoulder at the intersection between receiving chamber 86 and exit chamber 84.

Figure 3:
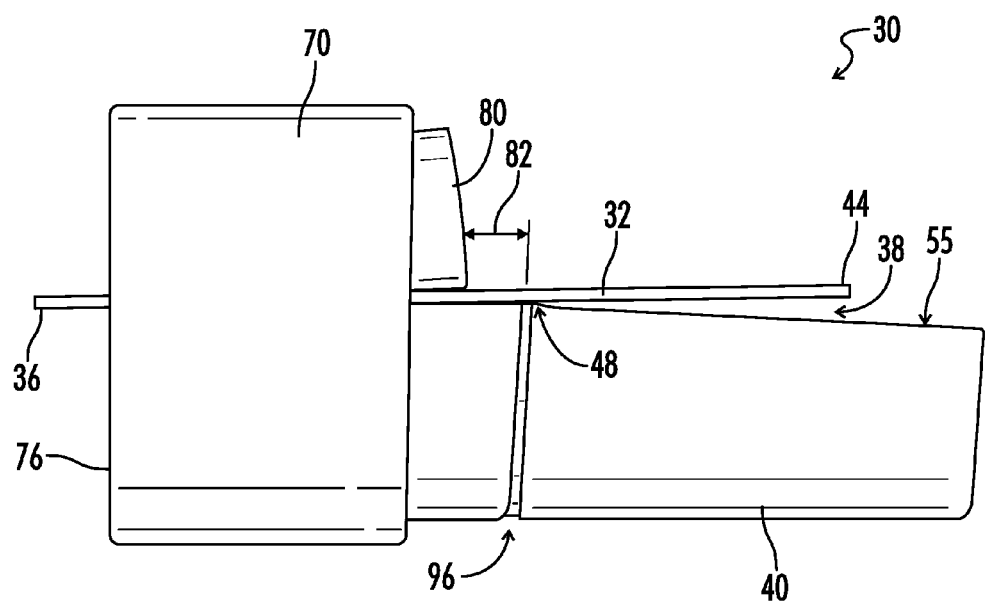
FIG. 3 illustrates a side elevation view of an embodiment of a reed assembly of a gobble call in accordance with the present invention.

Referring now to FIG. 3, in some embodiments, a reed assembly 30 includes a tone board 40, a reed 32 positioned adjacent tone board 40 and a wedge 80 positioned against reed 32 such that reed 32 is partially clamped between wedge 80 and tone board 40. Reed assembly 30 is generally disposed in the axial bore 18 of the barrel 12 such that no portion of reed assembly 30 protrudes from either end of axial bore 18.

Figure 10:
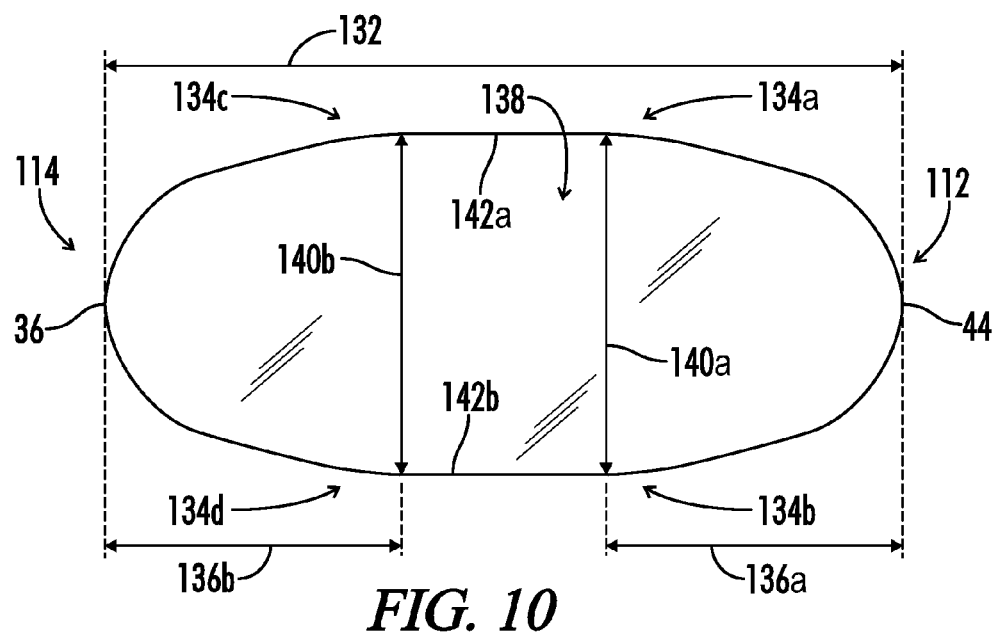
FIG. 10 illustrates a plan view of an embodiment of a reed in accordance with the present invention.

An embodiment of a reed 32 is illustrated generally in FIG. 10. Reed 32 includes a first curved reed end 112 and a second curved reed end 114. In some embodiments, first curved reed end 112 has a first radius of curvature, and second curved end 114 has a second radius of curvature, wherein the second radius of curvature is less than the first radius of curvature. In such embodiments, reed 32 may be configured to produce different sounds depending on which end of reed 32 is operable. Reed 32 in some embodiments includes a polymer or a polyester film. In some embodiments reed 32 comprises polyethylene terephthalate, or a biaxially-oriented polyethylene terephthalate, also known as boPET or Mylar. In other applications, reed 32 can include other suitable types of reed materials, including but not limited to wood, plastic, acrylic or metal. Reed 32 includes an average reed thickness between about 0.2 and about 0.5 millimeters. In yet a further embodiment, a reed thickness between about 0.25 mm and about 0.50 mm produces a desired gobble sound. In a more preferred embodiment, a reed thickness of about 0.4 millimeters produces a desired turkey gobble sound.

Figure 4A:
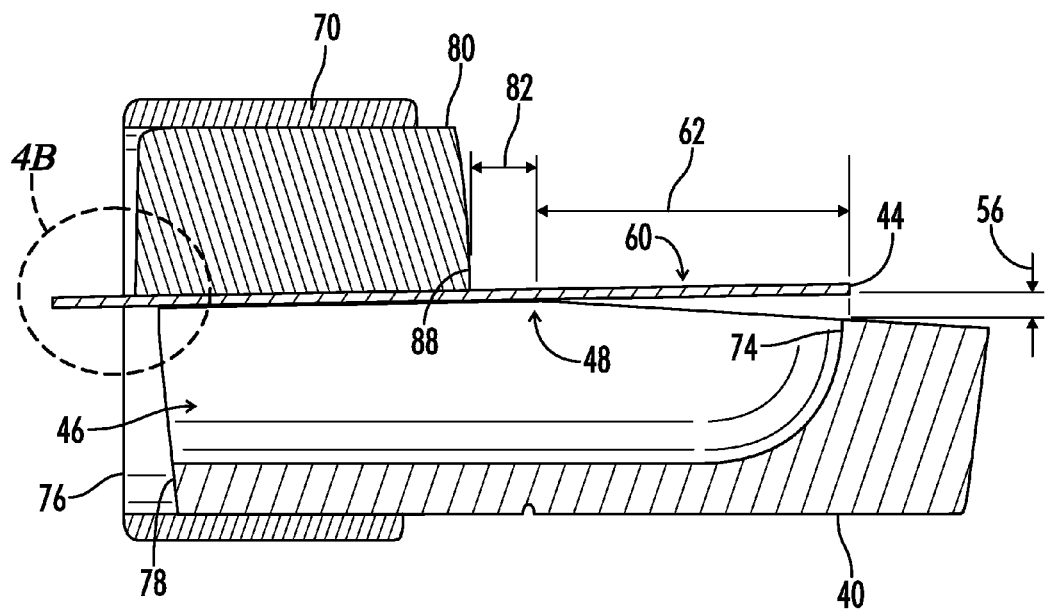
FIG. 4A illustrates a cross-sectional view of the embodiment of a reed assembly of FIG. 3.
Figure 7:
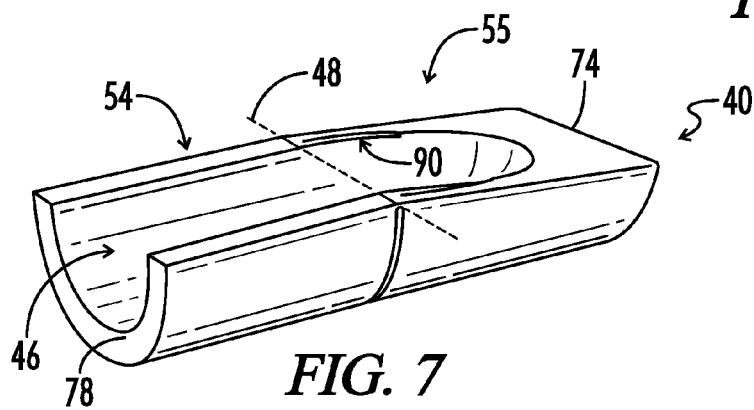
FIG. 7 illustrates a perspective view of an embodiment of a tone board in accordance with the present invention.

In some embodiments, as seen in FIG. 7, tone board 40 includes a first board region 54 and a second board region 55. Each board region includes a portion of the tone board surface. First and second tone board regions are separated generally by a vertex 48. Referring to FIG. 3, FIG. 4A and FIG. 7, in some embodiments, first board region 54 generally engages reed 32, and second board region 55 is generally separated from reed 32 by a reed gap 38. As tone board 40 extends away from proximal tone board end 78 beyond vertex 48, tone board 40 is angled or curved away from reed 32, thereby forming a reed gap 38, seen in FIG. 3. Reed gap 38 allows reed 32 to oscillate, flex, vibrate, or intermittently slap against tone board 40 along second board region 55 to create an audible sound. Reed gap 38 defines a distal reed gap distance 56 defined as the shortest distance between the distal reed end 44 and the tone board 40. In some embodiments, the distal reed gap distance 56 is between about 1.3 mm and about 1.9 mm. In further embodiments, the distal reed gap distance is between about 1.5 mm and about 1.7 mm. In further embodiments, the distal reed gap distance is about 1.6 mm.

Referring further to FIG. 3, in some embodiments, a reed gap 38 is defined between vertex 48 and distal reed end 34. As seen in FIG. 3 and FIG. 4A, in some embodiments, wedge 80 is positioned proximate vertex 48, creating a wedge offset 82 between the distal wedge end 88 and vertex 48. Vertex 48 in some embodiments can be defined at the location where tone board 40 diverges away from reed 32. Wedge offset 82 is characterized by an axial wedge offset distance defined as the distance between the vertex 48 and the distal wedge end 88, seen in FIG. 4A. Wedge offset 82 provides a region of reed 32 that engages first board region 54 on tone board 40 but does not contact wedge 80. Wedge offset 82 is formed as the section of reed 32 extending between distal wedge end 88 and vertex 48. As such, when reed 32 resiliently flexes downward toward tone board 40, reed 32 may locally maintain engagement with the portion of first board section 54 extending between distal wedge end 88 and vertex 48. However, as reed 32 resiliently flexes upward away from tone board 40, reed 32 may locally disengage from the portion of first board section 54 extending between distal wedge end 88 and vertex 48. In some embodiments, wedge offset 82 defining a desired axial wedge offset distance contributes to the ability of turkey call 10 to produce a desired gobble sound.

After experimentation with a variety of configurations, it was determined that a gobble sound can be produced over a range of wedge offsets 82 and axial wedge offset distances. When distal wedge end 88 is too far from vertex 48, a gobble sound cannot be produced. Additionally, when distal wedge end 88 is too near vertex 48, a gobble sound cannot be produced. Surprisingly, only when distal wedge end 88 is located in an optimal position relative to vertex 48 can the desired gobble sound be produced. In some embodiments, wedge offset 82, and the corresponding axial wedge offset distance, is between about two millimeters and about six millimeters. In further embodiments, wedge offset distance 82 is between about 3.5 millimeters and about five millimeters. In yet another embodiment, wedge offset distance 82 is between about 3.96 millimeters and about 4.76 millimeters. In another embodiment, wedge offset distance 82 is about 4.4 millimeters. It is understood that in some embodiments, the range of acceptable wedge offset distances 82 may increase or decrease depending on changes to the dimensions of other parts. Thus, it is desirable to define an acceptable range of wedge offsets 82 relative to other dimensions in some embodiments.

As seen in FIG. 4A, in some embodiments, a free reed section 60 is defined as the section of reed 32 extending between vertex 48 and distal reed end 44. Free reed section 60 forms the part of reed 32 that is separated from tone board 40 by gap 38. Free reed section 60 includes a free reed section length 62. In some embodiments, free reed section 60 includes a free reed section length 62 between about 12.7 millimeters and about 14.3 millimeters. In some embodiments, a ratio of free reed section length 62 to wedge offset 82 of between about 2.0 and about 5.0 produces a gobble sound. In further embodiments, a ratio of free reed section length 62 to wedge offset 82 of between about 2.6 and about 3.6 produces a desired gobble sound. In a further embodiment, a ratio of free reed section length 62 to wedge offset 82 of about 3.1 produces a desired gobble sound. It is understood that changes in other dimensions of call 10 can result in variance in the proper range of ratios of free reed section length to wedge offset that produce desired gobble sounds.

In some embodiments, wedge 80 can be slid back any distance from vertex 48 providing a wedge offset distance 82 greater than about 3.0 mm to produce a desired turkey gobble sound. In some embodiments, the ratio of free reed section length 62 to wedge offset distance 82 is less than about 5.0. In other embodiments, the ratio of free reed section length 62 to wedge offset distance 82 is between about 0.1 and about 5.0.

In some conventional game calls, distal wedge end 88 extends beyond vertex 48 to a location between vertex 48 and distal reed end 44. In other conventional game calls, distal wedge end 88 is located very near vertex 48 such that the ratio of free reed section length 62 to wedge offset 82 is very large. Such conventional configurations may produce sounds associated with ducks or geese, but are not operable to reproduce the sound of a turkey gobble. Unexpectedly, by positioning the wedge 80 away from vertex 48 in the direction away from distal reed end 44 such that the ratio of free reed section length to the wedge offset 82 is within a unique range, it was discovered that reed assembly 30 may become operable to, or is configured to, produce a turkey gobble call.

Figure 8:
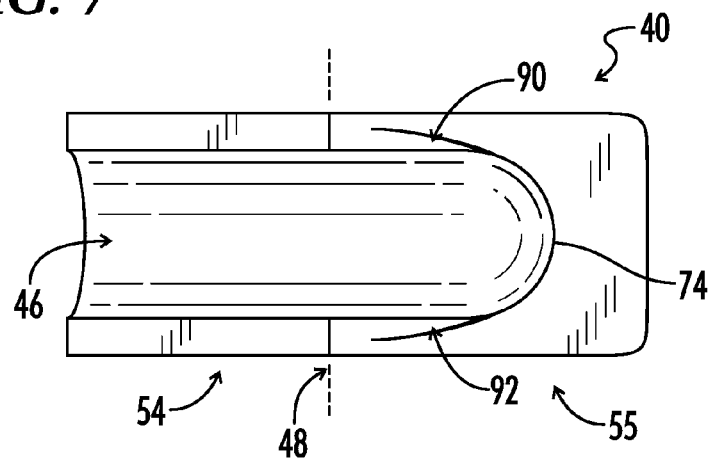
FIG. 8 illustrates a plan view of the embodiment of a tone board of FIG. 7.

Referring now to FIGS. 4A, 7 and 8, in some embodiments, tone board 40 includes a board channel 46. Board channel 46 extends partially along the axial length of tone board 40 and includes a U-shape. Board channel 46 terminates at a channel end wall 74. Channel end wall 74 generally includes a curved shape. When air is blown into first barrel end 14 of barrel 12, the air travels along board channel 46 away from channel end wall 74. Referring to FIG. 3 and FIG. 4A, the air is passed through gap 38 between reed 32 and tone board 40. The passage of air through gap 38 between reed 32 and tone board 40 causes the reed 32 to fluctuate and emit a gobble sound.

Referring further to FIG. 4A, in some embodiments, channel end wall 74 may be axially aligned with distal reed end 44. In other embodiments, the axial distance between vertex 48 and channel end wall 74 is within about ten percent of free reed section length 62 extending between vertex 48 and distal reed end 44. By providing a reed distal end 44 that is axially aligned at or near the axial position of channel end wall 74, reed assembly 30 of the present invention becomes operable to produce a gobble sound in some embodiments. In some applications, the combination of an optimal wedge offset 82 having the above described characteristics and a distal reed end 44 aligned with or nearly aligned with channel end wall 74 produces a desirable gobble sound.

Figure 4B:
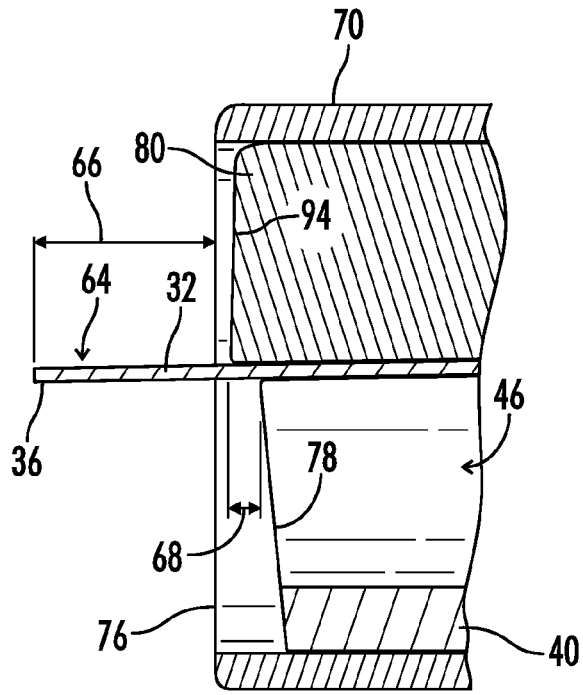
FIG. 4B illustrates a detail cross-sectional view of Section 4B from FIG. 4A showing an embodiment of an extended proximal reed end.
Figure 9:
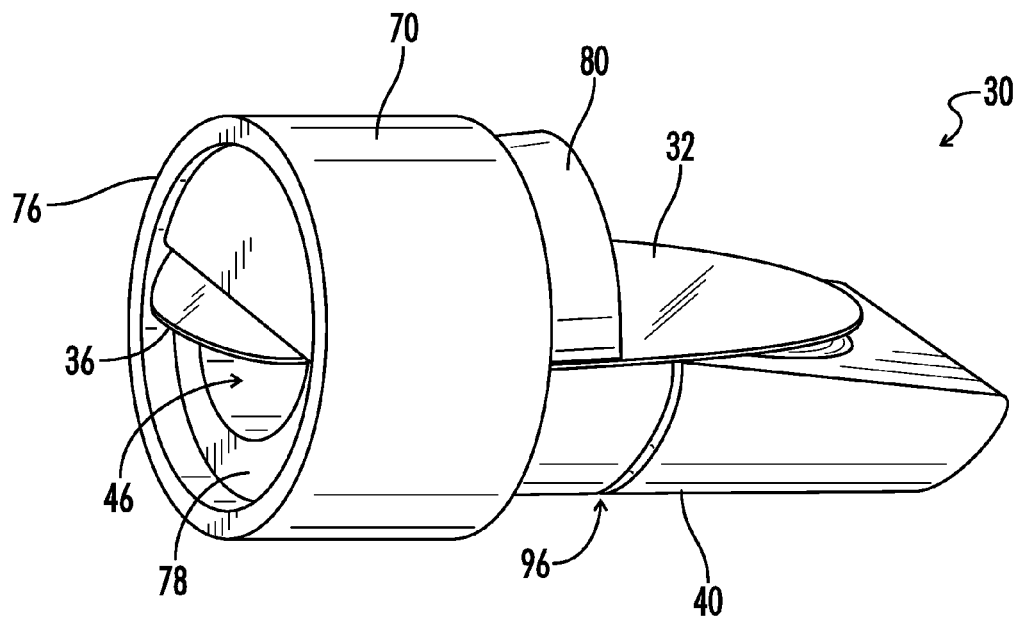
FIG. 9 illustrates a perspective view of an embodiment of a reed assembly in accordance with the present invention.

Referring further to FIG. 3 and FIG. 4B, in some embodiments, sleeve 70 is positioned on reed assembly 30 such that a proximal reed end 36 extends beyond proximal sleeve end 76 an extension distance 66 between about one and about ten millimeters. Proximal reed end 36 can include first or second curved reed ends 112, 114, seen in FIG. 10. Proximal reed end 36 may extend generally from the proximal ends of the wedge and tone board 94, 78 as seen in FIG. 9. Extension distance 66, seen in FIG. 4B, in some preferred embodiments is between about three and about six millimeters. In further embodiments, extension distance 66 is about five millimeters. Proximal reed end 36 in some embodiments contributes to flexing of reed 32 and improves the quality of the gobble sound produced by reed assembly 30. In some other embodiments, not shown, no portion of reed 32 extends beyond proximal sleeve end 76.

Figure 4C:
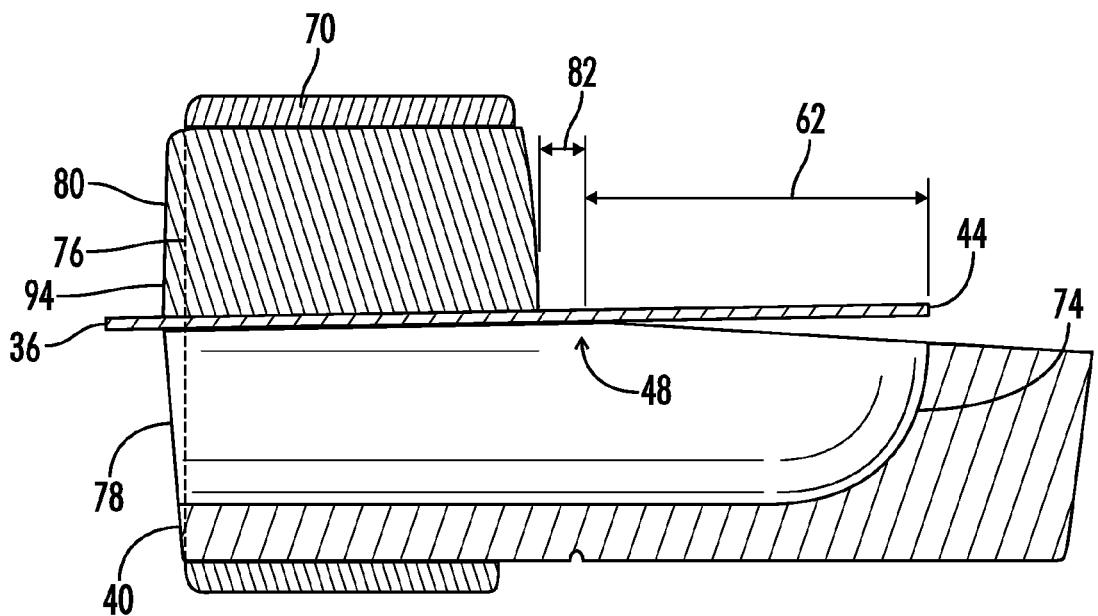
FIG. 4C illustrates a cross-sectional view of an embodiment of a reed assembly in accordance with the present invention.

Referring further to FIG. 4A and FIG. 4B, in some embodiments, proximal tone board end 78 is misaligned with proximal wedge end 94 by a tone board offset 68. Tone board offset 68 may be between about one and about five millimeters in some embodiments. In other embodiments, as seen in FIG. 4C, proximal wedge end 94 is axially aligned with proximal tone board end 78. Proximal sleeve end 76 can overhang wedge 80 in some embodiments, as seen in FIG. 4A and FIG. 4B. In other embodiments, wedge 80 and/or tone board 40 may extend from proximal sleeve end 76, as seen in FIG. 4C.

Figure 5:
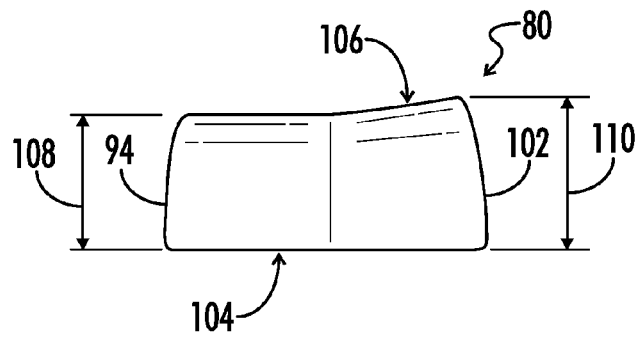
FIG. 5 illustrates a side elevation view of an embodiment of a wedge in accordance with the present invention.
Figure 6:
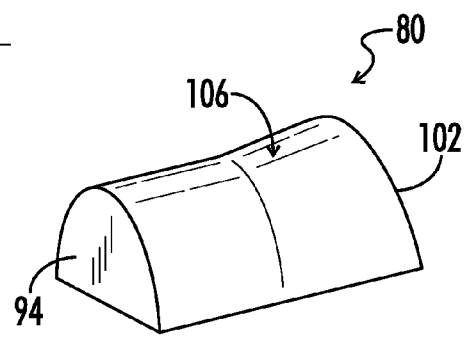
FIG. 6 illustrates a perspective view of the embodiment of a wedge of FIG. 5.

Referring now to FIG. 5 and FIG. 6, in some embodiments, wedge 80 includes a first wedge section 104 having a substantially uniform wedge height 108. Wedge 80 includes a second section including a wedge ramp 106. Wedge ramp 106 includes a wedge ramp height 110 greater than wedge height 108. As such, when sleeve 70 is slid axially onto reed assembly 30 from the proximal end, sleeve 70 may engage wedge ramp 106 to tighten wedge 80 down against reed 32 and tone board 40, as seen in FIGS. 4A and 4C. Wedge ramp 106 is generally oriented closer to vertex 48 than first wedge section 104 in some embodiments. Such orientation of wedge 80 may prevent sleeve 70 from axially dislodging when reed assembly 30 is slidably inserted into axial bore 18, as seen in FIG. 1.

Referring further to FIG. 7 and FIG. 8, tone board 40 in some embodiments includes first and second depressed ramps 90, 92 formed on the second board region 55 adjacent channel 46. As seen in FIG. 7, first ramp 90 forms a slight indentation on the upper surface of second region 55. First ramp 90 becomes less inclined as it progress away from channel end wall 74 toward vertex 48. First ramp 90 generally includes a recession to accommodate a portion of reed 32 as it vibrates against second region 55 of tone board 40. A depressed ramp is "depressed" in that it forms an indentation relative to the surrounding surface of the tone board that faces the reed. A depressed ramp provides a depressed region that simulates a worn-in portion of the tone board. In many applications, a reed 32 may wear a similar indentation into a tone board after extensive use. In some situations, such wear can enhance the sound produced by the call. By providing a tone board 40 with an integral, pre-formed first ramp 90, a "worn" tone board can be simulated to produce a desired sound. Similarly, second ramp 92 can be integrally formed on second board region 55 opposite first ramp 90. In some embodiments, tone board 40 is molded from a plastic or acrylic material, and first and second ramps 90, 92 are integrally formed on tone board 40 during the molding process. In other embodiments, first and second ramps 90, 92 can be stamped into tone board 40 following molding using a die or a press. In other embodiments, first and second ramps 90, 92 can be milled from the surface of tone board 40.

As seen in FIG. 3 and FIG. 9, in some embodiments, tone board 40 can include a vertex indicator 96. Vertex indicator 96 can include one or more features located on tone board 40 to indicate the position where the reed 32 diverges from the tone board 40 when the reed 32 is positioned flat against the tone board 40. The vertex indicator 96 provides a visual reference point for ensuring distal wedge end 88 is properly positioned relative to vertex 48 for producing a desired gobble sound. Vertex indicator 96 can include a semi-annular groove or indentation defined in tone board 40. In some embodiments, vertex indicator 96 is integrally formed in tone board 40.

Referring again to FIG. 4A, in some embodiments, length of free reed section 62 plus axial wedge offset distance of wedge offset 82 is between about $^{44}/_{64}$ths of an inch and about $^{46}/_{64}$ths of an inch. In additional embodiments, the axial wedge offset distance of wedge offset 82 is between about $^{10}/_{64}$ths of an inch and about $^{12}/_{64}$ths of an inch. In other embodiments, these values may be smaller or larger.

As noted above, in some applications, a desired turkey gobble call may only be reproduced when a proper alignment is achieved between reed 32, tone board 40 and wedge 80. During assembly, a worker may manually align a reed, tone board and wedge to the desired locations. However, such manual alignment may be time consuming and inefficient. To overcome this problem, in some embodiments, the present invention provides a snap-fit reed assembly that includes corresponding structures on the wedge and tone board to provide proper alignment. The reed assembly allows the reed to self-align during assembly between the wedge and tone board to attain a position that will produce a desired turkey gobble sound. Referring now to FIGS. 11-23, in additional embodiments, a turkey gobble call 10 includes a reed assembly including one or more pilot posts and one or more pilot holes, or recesses, for providing proper alignment between reed 32, tone board 40 and wedge 80.

Figure 11:
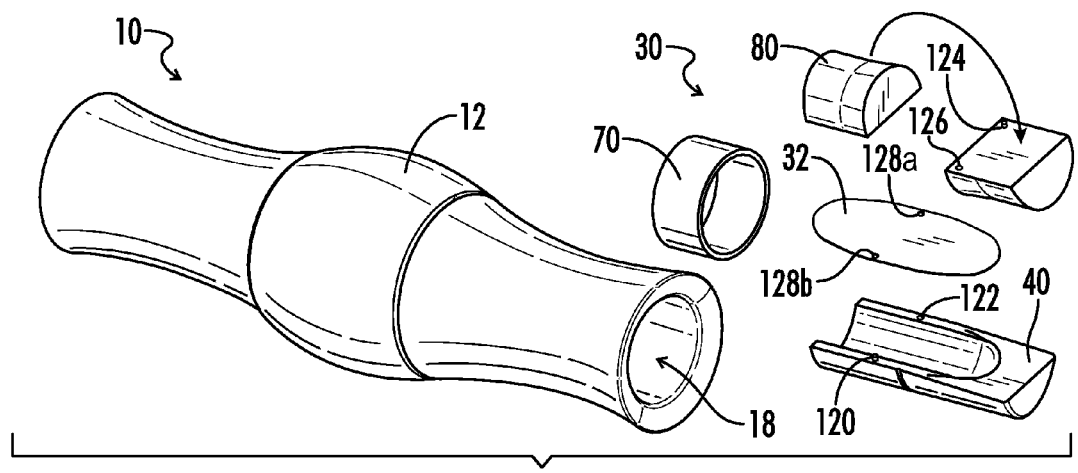
FIG. 11 illustrates an exploded perspective view of an embodiment of a gobble call with a reed assembly including one or more pilot posts and one or more corresponding pilot recesses.
Figure 16:
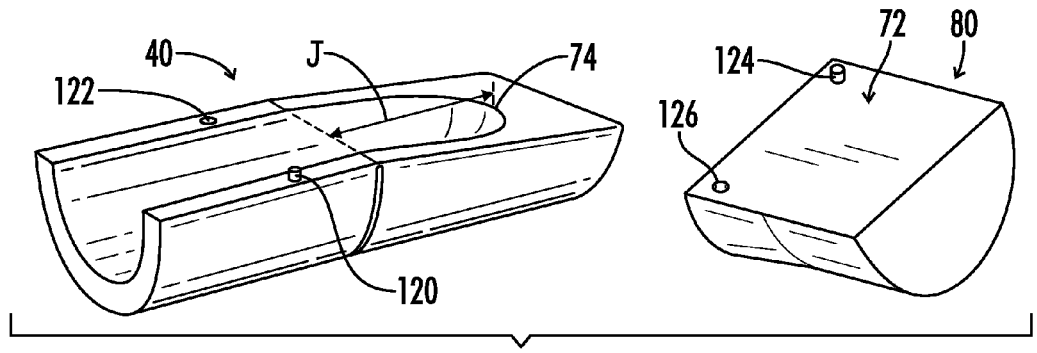
FIG. 16 illustrates a partially exploded perspective view of an embodiment of a reed assembly including a tone board and a wedge.

Referring to FIG. 11 and FIG. 16, in some embodiments, a reed assembly includes a wedge 80 having at least one wedge pilot post 124 extending from wedge base surface 72. Wedge base surface 72 is a substantially flat surface on the base of wedge 80 in some embodiments that contacts reed 32 when the reed assembly is fully assembled.

The at least one wedge pilot post 124 extends from wedge 80 and engages a corresponding tone board pilot hole 122, or recess, defined in tone board 40. In some embodiments, the diameter of wedge pilot post 124 is slightly larger than the inner diameter of tone board pilot hole 122 such wedge pilot post 124 engages tone board pilot hole 122 in an interference fit for securing wedge 80 to tone board 40. Wedge 80 engages tone board 40 in a snap fit when any one pilot post includes a cross-sectional dimension larger than a corresponding cross-sectional dimension of a pilot hole engaged by the pilot post. Each pilot post may include an integral feature integrally molded on a wedge or a tone board in some embodiments.

Referring further to FIG. 11 and FIG. 16, wedge 80 in some embodiments may also include at least one wedge pilot hole 126, or recess, defined in wedge base surface 72. Wedge pilot hole 126 may be shaped to receive a corresponding tone board pilot post 120 extending from tone board 40 and particularly from tone board mounting surface 98. Tone board mounting surface 98 is generally defined as the upper surface of tone board 40 that engages reed 32 when the reed assembly is fully assembled. Tone board pilot post 120 may also engage wedge pilot hole 126 in an interference fit in some embodiments. Thus, first tone board pilot post extends through the first reed hole into the first wedge pilot hole in some embodiments.

Figure 12:
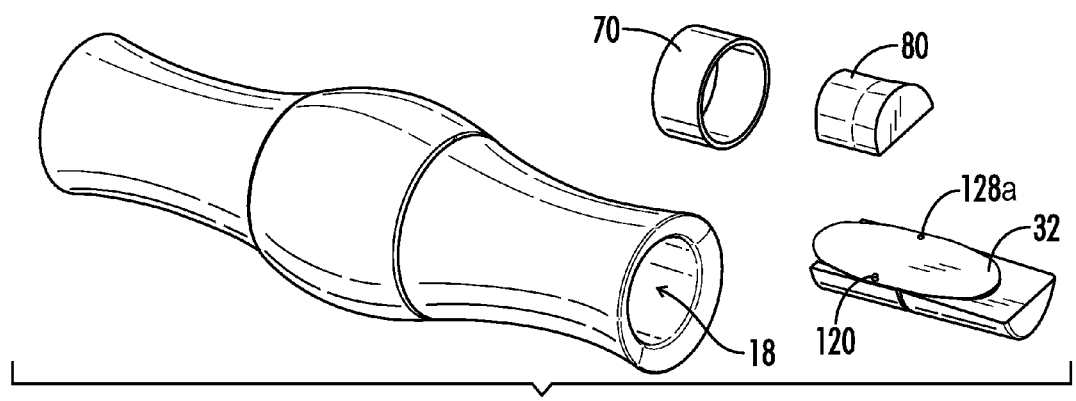
FIG. 12 illustrates a partially exploded perspective view of an embodiment of a gobble call of FIG. 11 showing the reed installed on the tone board.
Figure 13:
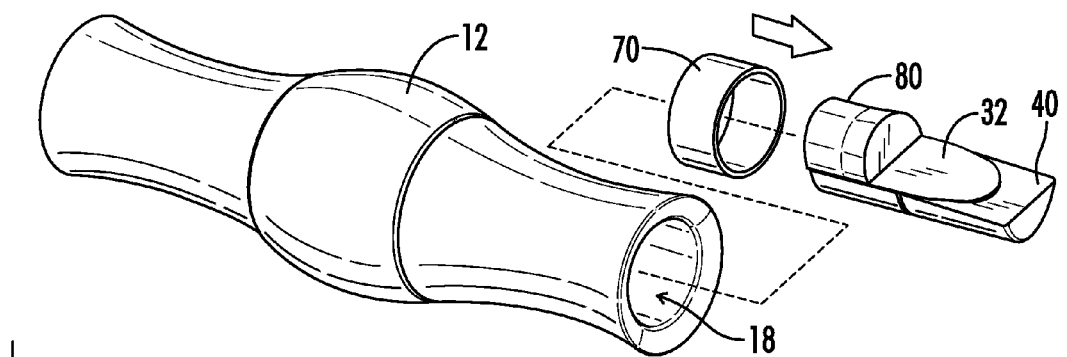
FIG. 13 illustrates a partially exploded perspective view of the embodiment of a gobble call of FIG. 11 showing the reed and wedge installed on the tone board.

Referring further to FIG. 11, FIG. 12, FIG. 22 and FIG. 23, in some embodiments, the present invention provides a reed 32 including one or more reed holes 122a, 122b defined therein. In some embodiments, reed 32 includes only one reed hole. In other embodiments, reed 32 includes two or more reed holes. Each reed hole may be aligned with a corresponding structure on wedge 80 or tone board 40 during call assembly. For example, as seen in FIG. 11 and FIG. 12, first reed hole 128a may be aligned with tone board pilot hole 122, and second reed hole 128b may be aligned with tone board pilot post 120 when reed 32 is positioned above tone board 40. In some embodiments each reed hole is substantially the same diameter as its corresponding pilot post. In other embodiments, each reed hole is slightly larger than its corresponding pilot post. From this position, reed 32 may be seated on tone board 40 such that tone board pilot post 120 extends through second reed hole 128b. This engagement secures tone board 32 in a desired axial position relative to tone board 40. After reed 32 is installed on tone board 40, wedge 80 may be seated on reed 32 such that wedge pilot post 124 extends through first reed hole 128a and into tone board pilot hole 122, and also such that tone board pilot post 120 extends through second reed hole 128b and into wedge pilot hole 126, as seen in FIG. 13. The various pilot posts and pilot holes prevent wedge 80, tone board 40 and reed 32 from becoming axially displaced, and provide a consistent positioning between the reed 32, and tone board 40 and wedge 80.

Figure 14:
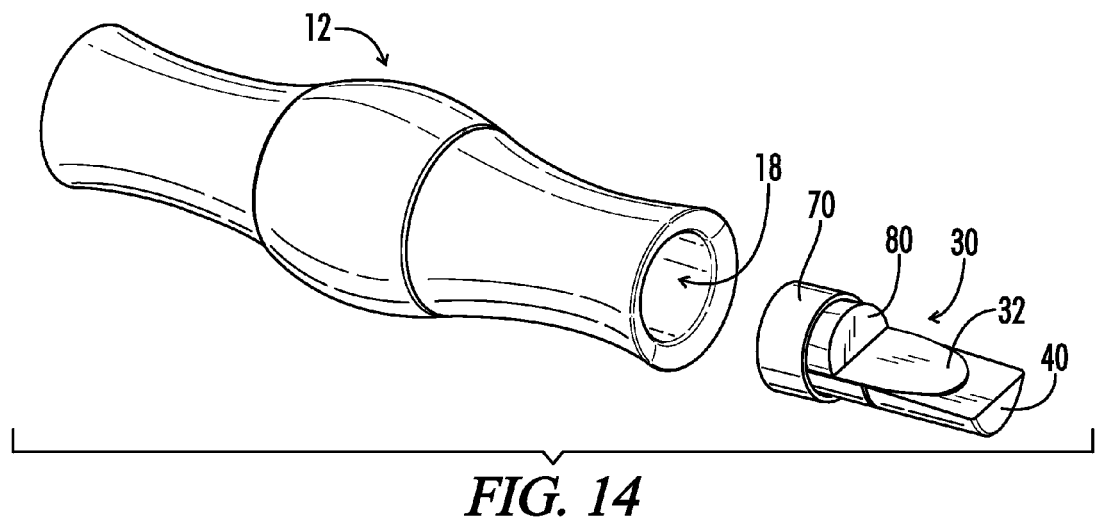
FIG. 14 illustrates a partially exploded perspective view of an embodiment of a gobble call of FIG. 11 showing the reed, wedge and sleeve disposed on the tone board.
Figure 15:
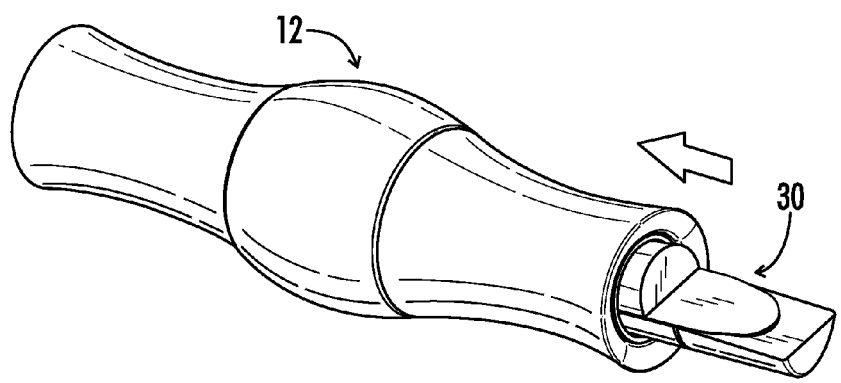
FIG. 15 illustrates a perspective view of an embodiment of a gobble call showing a reed assembly partially installed in a barrel.

After wedge 80, tone board 40, and reed 32 are assembled, sleeve 70 may be slid onto wedge 80, tone board 40 and reed 32 to prevent the parts from separating radially, forming a reed assembly 30, as seen in FIG. 14. The reed assembly 30 may be inserted axially into axial bore 18 on barrel 12 in some embodiments, as seen in FIG. 15, to form a turkey gobble call 10.

Figure 17:
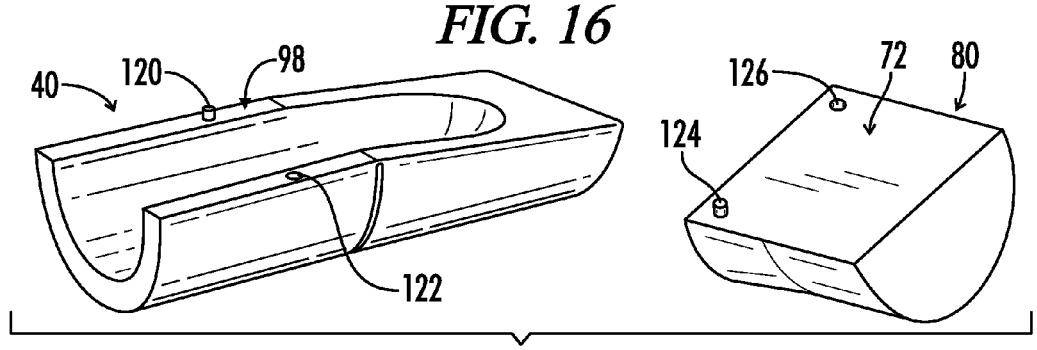
FIG. 17 illustrates a partially exploded perspective view of an alternative embodiment of a reed assembly including a tone board and a wedge.

It is appreciated by those of skill in the art that various other embodiments of a reed assembly including one or more pilot posts and one or more pilot holes are encompassed in the scope of the present invention. For example, as seen in FIG. 17, the locations of the wedge pilot post 124 and wedge pilot hole 126 may be placed on different sides of the wedge base surface 72. Similarly, the corresponding tone board pilot post 120 and tone board pilot hole 122 may also be placed on different sides of the tone board mounting surface 98.

Figure 18:
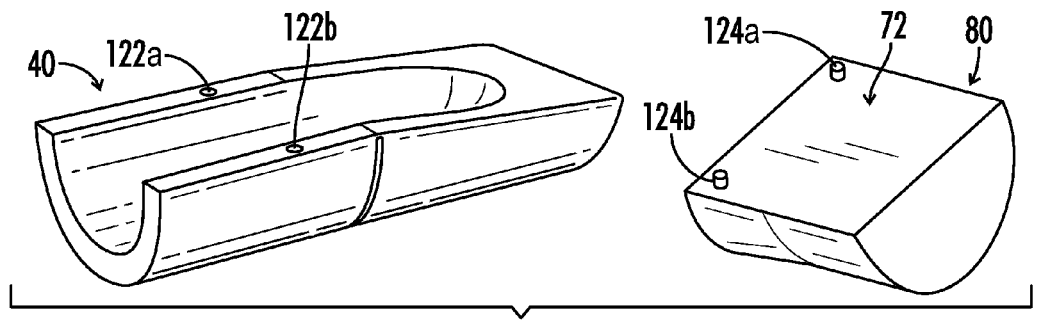
FIG. 18 illustrates a partially exploded perspective view of an alternative embodiment of a reed assembly including a tone board and a wedge.

In another embodiment, as seen in FIG. 18, wedge 80 may include first and second wedge pilot posts 124a, 124b extending from wedge base surface 72, and tone board 40 may include first and second tone board pilot holes 122a, 122b defined in tone board mounting surface 98. In such embodiments, wedge 80 may be engaged with tone board 40 by inserting first wedge pilot post 124a into first tone board pilot hole 122a, and by inserting second wedge pilot post 124b into second tone board pilot hole 122b. In such embodiments, reed 32 includes first and second reed holes 128a, 128b through which first and second wedge pilot posts 124a, 124b may pass for proper alignment of reed 32.

Figure 19:
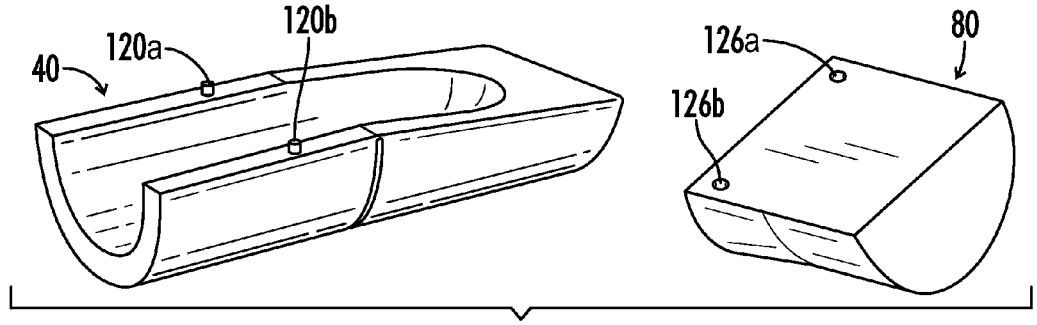
FIG. 19 illustrates a partially exploded perspective view of an alternative embodiment of a reed assembly including a tone board and a wedge.

As seen in FIG. 19, in some embodiments, wedge 80 may include first and second wedge pilot holes 126a, 126b defined in wedge base surface 72, and tone board 40 may include first and second tone board pilot posts 120a, 120b extending from tone board mounting surface 98. In such embodiments, wedge 80 may be engaged with tone board 40 by receiving first tone board pilot post 120a in first wedge pilot hole 126a, and by receiving second tone board pilot post 120b in second wedge pilot hole 126b. In such embodiments, reed 32 includes first and second reed holes 128a, 128b through which first and second tone board pilot posts 120a, 120b may pass for proper alignment of reed 32.

During manufacture and assembly of turkey gobble call 10, wedge 80 may be installed onto tone board 40 with reed 32 sandwiched between wedge 80 and tone board 40.

Figures 20, 21:
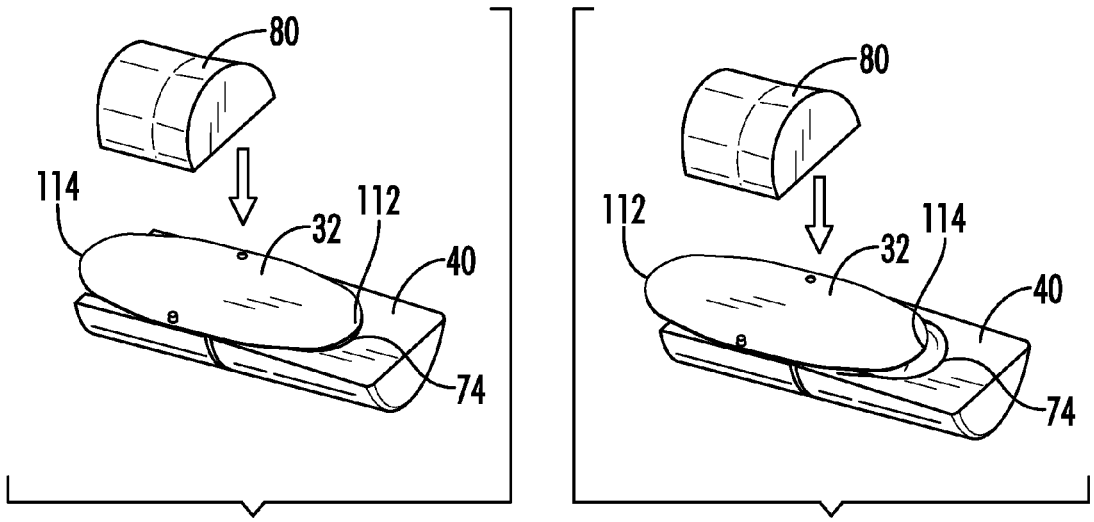
FIG. 20 illustrates a partially exploded perspective view of an alternative embodiment of a reed assembly showing a reed positioned on a tone board.
FIG. 21 illustrates a partially exploded perspective view of an alternative embodiment of a reed assembly showing a reed positioned on a tone board.
Figure 22:
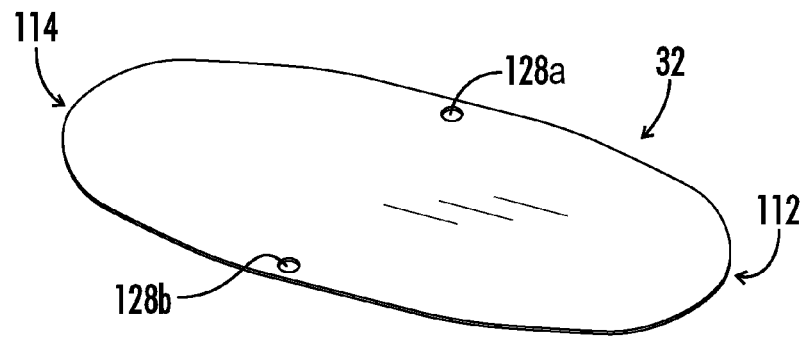
FIG. 22 illustrates a perspective view of an embodiment of a reed for a turkey gobble call.

Referring to FIG. 20 and FIG. 21, in some embodiments, the snap-together configuration of tone board 40 and wedge 80 may eliminate the need for a sleeve to hold the tone board, wedge and reed together. In such embodiments, the turkey gobble call reed assembly includes only a wedge, reed and tone board.

In some embodiments, reed 32 includes first and second reed holes 128a, 128b defined in reed 32 along a reed hole axis 130 oriented substantially transverse to the longitudinal axis of reed 32. Reed holes axis 130 may be located equidistantly between first curved reed end 112 and second curved reed end 114 in some embodiments such that first reed hole axis length H is substantially equal to second reed hole axis length I. In such embodiments, reed 32 may be removed from reed assembly and rotated 180 degrees if the operating end of reed 32 nearest channel end wall 74 should become damaged or worn. By rotating reed 32 in some embodiments, the life of the call can be extended without replacing the reed.

Figure 23:
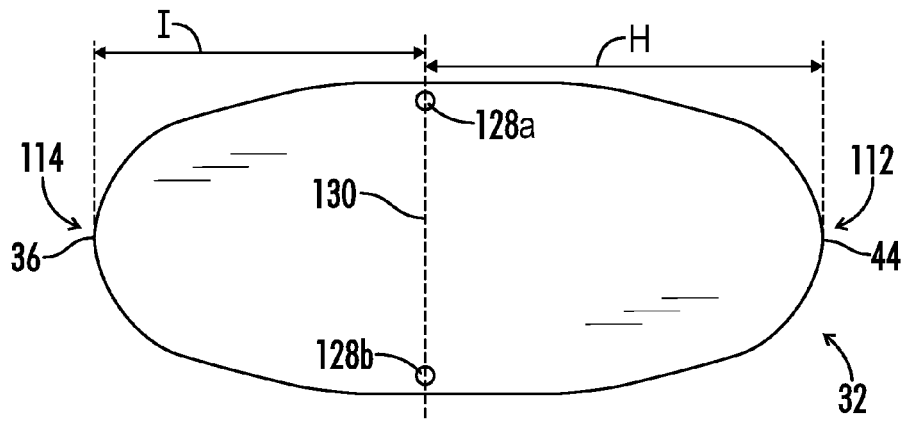
FIG. 23 illustrates a plan view of an embodiment of a reed for a turkey gobble call.

In additional embodiments, reed 32 includes first and second reed holes 128a, 128b defined in reed 32 along a reed hole axis 130, wherein reed hole axis 130 is located nearer one end of reed 32. For example, in some embodiments, as seen in FIG. 23, reed hole axis 130 may be located nearer second curved reed end 114 such that first reed hole axis length H is greater than second reed hole axis length I. As such, reed 32 may be positioned between wedge 80 and tone board 40 in two different configurations. In a first configuration wherein first curved reed end 112 extends toward channel end wall 74 on tone board 40, first curved reed end 112 may be aligned with channel end wall 74. However, in a second configuration wherein second curved reed end 114 extends toward channel end wall 74, second curved reed end 114 may not be aligned with channel end wall 74 because distance I is not equal to distance H. As such, the first and second configurations may produce different sounds during use of call 10. Thus, reed 32 may be interchangeably used with a call 10 to produce different sounds simply by removing reed 32 and rotating reed 180 degrees such that a different reed end is located nearest channel end wall 74.

Referring further to FIG. 10, in some embodiments, reed 32 includes specific dimensions configured to produce a desired turkey gobble sound. Unexpectedly, certain ranges of reed dimensions provide a desired turkey gobble sound, while reeds with dimensions outside the certain ranges are not operable to produce a turkey gobble sound. In some embodiments, reed 32 includes a reed length 132 extending between first and second curved reed ends 112, 114 and having a value of between about 25 mm and about 51 mm. In additional embodiments, reed length 132 is between about 33 mm and about 39 mm. In further embodiments, reed length 132 is about 36 mm.

Reed 32 also includes a unique shape having a first curved reed end 112 and a second curved reed end 114 in some embodiments. Reed 32 also includes a rectangular center section 138 having a substantially rectangular profile disposed between first and second curved reed ends 112, 114. Reed center section 138 defines a first reed width 140a nearer first curved reed end 112 and a second reed width 140b nearer second curved reed end 114. In some embodiments, first and second reed widths 140a, 140b are substantially the same. Reed center section 138 includes first and second reed side edges 142a, 142b extending along the perimeter of reed 32 between first and second reed widths 140a, 140b. First and second reed edges 142a, 142b may be substantially parallel in some embodiments. A first reed shoulder 134a is defined adjacent first reed side edge 142a nearer first curved reed end 112. A second reed shoulder 134b is defined adjacent second reed side edge 142b nearer second curved reed end 112. First and second reed shoulders 134a, 134b are located at the positions where first curved reed end 112 begins to extend from reed center section 138. The section of reed 32 between center reed section 138 and first reed end 112 includes a first narrowing taper. Similarly, a third reed shoulder 134c is defined adjacent first reed side edge 142a nearer second curved reed end 112. A fourth reed shoulder 134d is defined adjacent second reed side edge 142b nearer second curved reed end 112. Third and fourth reed shoulders 134c, 134d are located at the positions where second curved reed end 114 begins to extend from reed center section 138. The second of reed 32 between center reed section 138 and second curved reed end 114 includes a second narrowing taper. In some embodiments, first and second narrowing tapers include the same profile. In various other embodiments, first and second narrowing tapers include slightly different profiles.

As seen in FIG. 10, in some embodiments, a first curved reed end 112 includes a first reed end length 136a corresponding to the distance between distal end 44 on first curved reed end 112 and reed center section 138. First reed end length 136a is between about 7 mm and about 16 mm in some embodiments. In other embodiments, first reed end length 136a is between about 10 mm and about 13 mm. In other embodiments, first reed end length 136a is about 11.6 mm.

Second curved reed end 114 includes a second reed end length 136b corresponding to the distance between proximal end 36 on second curved reed end 114 and reed center section 138. Second reed end length 136b is between about 7 mm and about 16 mm in some embodiments. In other embodiments, second reed end length 136b is between about 10 mm and about 13 mm. In other embodiments, second reed end length 136b is about 11.6 mm.

In some embodiments, tone board 40 defines a tone board pilot offset J defined as the axial distance between the tone board pilot post 120 or tone board pilot hole 122 and channel end wall 74. In some embodiments, the tone board pilot offset J is substantially equal to first reed hole axis length H such that when reed 32 is installed on tone board 40, reed distal end 44 is axially aligned with channel end wall 74.

It will be further appreciated by those of skill in the art that game calls including one or more pilot posts extending through a reed between the wedge and the tone board may prevent the reed from becoming inadvertently misaligned in both axial directions relative to the wedge or tone board in the event that the wedge is dropped or impacted against another object or disassembled by a user.

In further embodiments, the present invention provides a method of manufacturing a game call. The method includes the steps of: (a) providing a tone board having a tone board channel and a tone board mounting surface; (b) positioning a reed against the tone board mounting surface, the reed including at least one reed hole extending through the reed; (c) positioning a wedge against the reed; and (d) positioning a pilot post through the reed hole in the reed between the tone board and the wedge such that the reed is positioned at a desired location relative to the wedge and tone board. The method may also include the step of installing a sleeve axially onto the wedge and tone board. In some embodiments, the pilot post extends from the tone board through the reed hole into a wedge pilot recess defined in the wedge. In further embodiments, the pilot post extends from the wedge through the reed hole into a tone board pilot recess defined in the tone board. In additional embodiments, the method includes a step of inserting the wedge, the reed and the tone board together into an axial bore of a barrel.

In a further embodiment, the present invention provides a method of preventing a user from detuning a turkey gobble call. By providing at least one pilot post that extends through a reed hole in the reed, wherein the reed hole is substantially the same diameter as the pilot post, a the reed may attain only one axial location between the wedge and the tone board. Thus, an inexperienced user who disassembles the reed assembly will be able to re-assemble the assembly in working order and cannot inadvertently de-tune the call.

Thus, although there have been described particular embodiments of the present invention of a new and useful Single Reed Turkey Gobble Call, it is not intended that such references be construed as limitations upon the scope of the invention except as set forth in the following claims.

What is claimed is:

1. A turkey gobble call, comprising:
a tone board defining a U-shaped channel extending partially along an axial length of the tone board, the channel terminating at a channel end wall;
a reed positioned against the tone board over the channel;
a wedge positioned against the reed so that the reed is partially clamped between the tone board and the wedge, the reed including a distal reed end extending from the wedge toward the channel end wall; and
the tone board including a first board region engaging the reed and a second board region separated from the reed by a reed gap, the tone board including a vertex located where the first board region meets the second board region;

the reed including a free reed section length defined as the distance between the vertex and the distal reed end, wherein the wedge is axially offset from the vertex in the direction away from the distal reed end by a wedge offset distance, wherein a ratio of the free reed section length to the wedge offset distance is between about 2.0 and about 5.0, and wherein the call is configured to produce a sound representative of the gobble call of a male turkey when air is blown through the call.

2. The apparatus of claim 1, wherein:
the wedge offset distance is greater than about 3.0 mm.

3. The apparatus of claim 1, wherein:
the wedge offset distance is between about 2.0 mm and about 6.0 mm.

4. The apparatus of claim 1, wherein:
the wedge offset distance is between about 3.5 mm and about 5.0 mm.

5. The apparatus of claim 4, wherein:
the reed comprises mylar; and
the reed includes a reed thickness between about 0.2 mm and about 0.5 mm.

6. The apparatus of claim 1, wherein:
the ratio of the free reed section length to the wedge offset distance is less than about 5.0.

7. The apparatus of claim 1, further comprising:
a sleeve disposed around the wedge, the reed, and the tone board; and
a barrel disposed around the sleeve.

8. The apparatus of claim 7, wherein:
the sleeve comprises plastic.

9. The apparatus of claim 8, wherein:
the barrel comprises plastic.

10. The apparatus of claim 8, wherein:
the barrel comprises wood.

11. The apparatus of claim 8, wherein:
the barrel comprises acrylic.

12. The apparatus of claim 8, wherein:
the barrel includes an exit chamber having an exit chamber inner diameter between about 15 mm and about 25 mm.

13. The apparatus of claim 1, further comprising:
the reed gap including a distal reed gap distance defined as the shortest distance between the distal reed end and the tone board,
wherein the distal reed gap distance is between about 1.3 mm and about 1.9 mm.

14. The apparatus of claim 13, wherein:
the distal reed gap distance is about 1.6 mm.

15. The apparatus of claim 14, wherein:
the reed includes a reed thickness between about 0.2 mm and about 0.5 mm.

16. The apparatus of claim 15, wherein:
the reed comprises mylar.

17. The apparatus of claim 1, further comprising:
the reed comprises mylar and includes a reed thickness between about 0.2 mm and about 0.5 mm;
a sleeve disposed around the wedge, reed, and tone board; and
a barrel disposed around the sleeve.

18. The apparatus of claim 17, wherein:
the wedge offset distance is between about 2.0 mm and about 6.0 mm.

19. The apparatus of claim 17, wherein:
the wedge offset distance is greater than about 3.0 mm.

20. The apparatus of claim 1, wherein;
the distal reed end extends axially beyond the channel end wall, wherein the axial distance between the distal reed end and the channel end wall is no greater than about ten percent of the free reed section length.

21. A turkey gobble call, comprising:
a barrel;
a sleeve disposed in the barrel;
a reed assembly disposed in the sleeve, the reed assembly further comprising:
a tone board;
a reed positioned against the tone board, the reed including a free reed section separated from the tone board by a reed gap;
a wedge positioned against the reed so that the reed is partially clamped between the wedge and the tone board, the reed including a distal reed end extending away from the wedge; and
a vertex defined on the tone board at the location where the reed separates from the tone board, the reed defining a free reed section length between the vertex and the distal reed end, wherein the wedge is axially offset from the vertex in the direction away from the distal reed end by a wedge offset distance, wherein the ratio of the free reed section length to the wedge offset distance is between about 2.0 and about 5.0, and wherein the call is configured to produce a sound representative of the gobble call of a male turkey when air is blown through the barrel.

22. The apparatus of claim 21, further comprising:
wherein the wedge offset distance is greater than about 3.0 mm.

23. The apparatus of claim 22, further comprising:
the reed including a reed thickness between about 0.2 mm and about 0.5 mm.

24. A turkey gobble call, comprising:
a tone board defining a U-shaped channel extending partially along an axial length of the tone board, the channel terminating at a channel end wall;
a reed positioned against the tone board over the channel;
a wedge positioned against the reed so that the reed is partially clamped between the tone board and the wedge, the reed including a distal reed end extending from the wedge toward the channel end wall; and
the tone board including a first board region engaging the reed and a second board region separated from the reed by a reed gap, the tone board including a vertex located where the first board region meets the second board region;
the reed including a free reed section length defined as the distance between the vertex and the distal reed end,
wherein the wedge is axially offset from the vertex in the direction away from the distal reed end by a wedge offset distance, and
wherein the wedge offset distance is greater than about 3.0 mm,
wherein the call is configured to produce a sound representative of the gobble call of a male turkey when air is blown through the call.

25. The apparatus of claim 24, wherein:
the ratio of the free reed section length to the wedge offset distance is between about 2.0 and about 5.0.

26. The apparatus of claim 24, wherein:
the reed includes a reed thickness between about 0.2 mm and about 0.5 mm.

27. The apparatus of claim 24, wherein:
the reed comprises mylar.

28. A turkey gobble call, comprising:
a barrel;
a sleeve disposed in the barrel;
a reed assembly disposed in the sleeve, the reed assembly further comprising:
  a tone board;
  a reed positioned against the tone board, the reed including a free reed section separated from the tone board by a reed gap;
  a wedge positioned against the reed so that the reed is partially clamped between the wedge and the tone board, the reed including a distal reed end extending away from the wedge; and
  a vertex defined on the tone board at the location where the reed separates from the tone board, the reed defining a free reed section length between the vertex and the distal reed end,
wherein the wedge is axially offset from the vertex in the direction away from the distal reed end by a wedge offset distance,
wherein wedge offset distance is greater than about 3.0 mm, and
wherein the call is configured to produce a sound representative of the gobble call of a male turkey when air is blown through the barrel.

29. The apparatus of claim 28, wherein:
the ratio of the free reed section length to the wedge offset distance is between about 2.0 and about 5.0.

30. The apparatus of claim 29, wherein:
the reed comprises mylar; and
the reed includes a reed thickness between about 0.2 mm and about 0.5 mm.

* * * * *